United States Patent Office 3,395,451

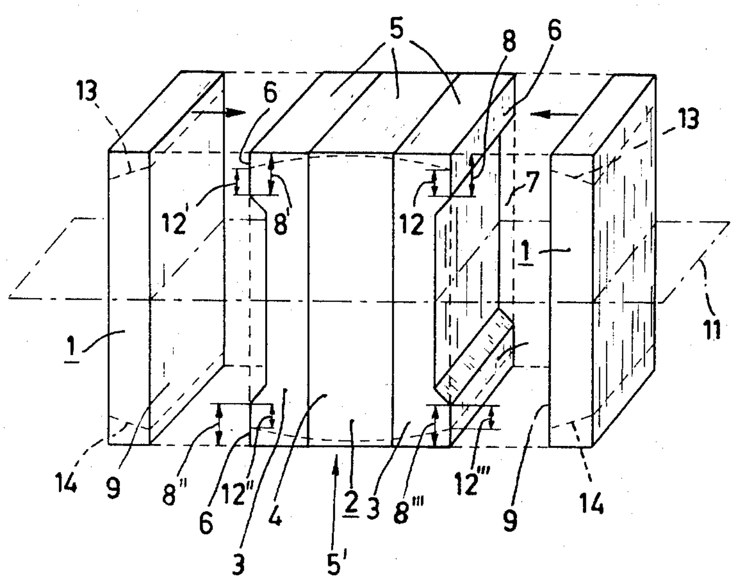
INVENTOR.
HANS P. PELOSCHEK
BY
Frank R. Trifari
AGENT

Patented Aug. 6, 1968

3,395,451

METHOD OF MANUFACTURING MULTIPLE MAGNETIC HEADS HAVING ACCURATELY DEFINED GAP HEIGHTS

Hans Peter Peloschek, Emmasingel, Eindhoven, Netherlands, assignor to North American Philips Company, Inc., New York, N.Y., a corporation of Delaware Filed Nov. 10, 1965, Ser. No. 507,130
Claims priority, application Netherlands, Nov. 10, 1964, 6413057
3 Claims. (Cl. 29—603)

ABSTRACT OF THE DISCLOSURE

A method of manufacturing a multiple magnetic head with an accurately positioned gap height, including the steps of bonding two ferrite members to opposite sides of a shielding plate to form a subassembly, grinding first and second parallel reference surfaces at right angles to the subassembly sides, grinding an exposed face in each of the subassembly sides, grinding further material from each of the ground faces to form a recess, using one of the end surfaces as a reference and starting at a distance from said reference surface which is greater than the ultimately desired gap surface height until the desired gap height is reached, and cementing a mating piece onto each side with a non-magnetic gap material.

The invention relates to a method of manufacturing a multiple magnetic head having an accurately defined gap height for recording reproducing and/or erasing magnetic records on a record carrier. The head comprises at least two magnetic circuits, each built up from at least two circuit portions of magnetisable material. At least one circuit portion is not profiled, and the circuits each include one useful gap which is filled with non-magnetisable material which may also serve at the same time to fasten the two circuit portions to each other. The centers of the useful gaps are arranged in line with each other in the direction of movement of the record carrier. A plate or a set of plates is arranged between the circuits for magnetically screening the circuits one from the other and for mechanically interconnecting the two circuits to each other.

Magnetic heads such as are described above are known and may be employed as a combined recording and reproducing head. It is not necessary in such heads for the boundary faces of the gap to be at right angles to the direction of movement of the record carrier or for the gaps to be parallel to each other.

A nonprofiled circuit portion is to denote here a circuit portion not having recesses. Since part of the magnetic circuits has to be surrounded by wire turns and since it is desirable for these wire turns to surround one of the aforesaid circuit portions, inter alia in connection with the direction of the stray fields, it is necessary to provide at least one of the circuit portions with a profile such that a space is left for accommodating said windings.

The aforesaid heads are manufactured in a known method by first making the screening plate or set of plates, on either side of which the non-profiled circuit portions are fastened. These circuit portions are ground to flatness and polished on their sides remote from the screening plate or set of plates. Part of the face thus obtained will serve as a boundary of the gap. A second face is provided on the body at right angles to said faces to serve as a running face for the record carrier. Then the separate circuit portions are also provided with a ground and polished face and, moreover, with a face at right angles thereto to form part of the running face in the ready head. At a given distance from said running face, which is accurately equal to the desired gap height, material is ground away from the polished face of each separate circuit portion to obtain a space for accommodating the windings, which are arranged in place after or prior to the interconnection of the two circuit portions.

This method has a disadvantage in that when the separate, accurately profiled circuit portions provided with a running face are secured to the circuit portions already provided on either side of the screening plate or set of plates, the running faces of the circuit portions have to be very accurately in line with each other in order to ensure that the gap height is constant with a tolerance of $5\mu$ throughout the width of the gap. This method is time consuming and the result frequently does not satisfy completely the requirements of constancy.

The invention mitigates these disadvantages and the method according to the invention is characterized in that, after a circuit portion has been fastened to each side of the plate or the set of plates, parallel reference faces are ground on the resultant body at right angles to the plate or plates on the lower and on the upper sides and in that at right angles to the reference faces a face is ground and polished on each of the circuit portions of the body. Material is then ground away, beginning at a distance from one of the reference faces greater than the desired gap height, and the circuit portions completing the circuits are arranged in place. Filling material for the gap is then inserted, and a running face provided on the whole structure thus obtained, the other reference face being used as the reference face.

By providing the desired height for the boundary faces of the gap in the circuit portions fastened to the plate or the set of plates, it is no longer important how the separate and profiled circuit portions are placed on said faces, provided the height of the joined faces is at least equal to the finally desired gap height. The upwardly projecting parts of the central body and/or the outer circuit portions are then ground off and the upper face of the head is ground off to an extent such that the desired gap height is attained. Grinding can be carried out with great accuracy by using as a face of orientation the second reference face of the central body, which face is accurately parallel to the first face.

The invention will be described more fully with reference to the drawing, which shows one embodiment of the invention.

The figure shows an isometric side elevation of two multiple magnetic heads in one stage of the manufacture.

Reference numeral 1 designates the separate, non-profiled circuit portions, 2 the central body formed by the profiled circuit portions 3, fastened to a plate of non-magnetisable material (or a set of plates, for example of magnetisable material alternating with non-magnetisable material and/or electrically conducting or non-conducting material 4). On the upper and lower sides of this body parallel faces 5 and 5′ (the reference faces) are provided by grinding. Faces 6 are provided on the circuit portions 3 arranged each on one side of the body 2. At distances 8, 8′, 8″ and 8‴ from the reference faces, which distances exceed the desired gap heights which may differ from each other, recesses 7 are provided in the faces 6.

The circuit portions 1 are provided with polished faces 9 and are urged in the direction of the arrow against the faces 6, while non-magnetisable material is provided between the faces 6 and 9, which material serves to fill the gaps and may secure the circuit portions to each other.

The first one of the reference faces is ground and polished to form a running face 13 for the record carrier. During this operation the gap heights 12 and 12′ are at the same time adjusted accurately. This adjustment may be very accurate since the opposite face 5′ is used as a reference face.

After the running face 13 is provided and the gap heights 12 and 12' are adjusted, a running face 14 is provided on the other side of the structure, whilst the gap heights 12'' and 12''' are adjusted in the same manner as described above, it being understood that now the running face 13 is used as a reference face.

The significance of the invention particularly resides in that the heights 12 is constant throughout the width of one gap. The gap height may differ from each other.

When the running faces 13 and 14 are provided in the manner described above, the whole structure is sawed along the plane 11, so that two multiple heads are obtained, though still without yokes for the magnetic circuits.

What is claimed is:

1. A method of manufacturing a multiple magnetic head having accurately defined operative gap surface heights comprising the steps of: securing a first magnetic circuit portion to each of two opposing sides of a shielding subassembly including at least one shielding plate, grinding first and second substantially parallel reference surfaces on opposing ends of the resultant body at substantially right angles to said subassembly sides, grinding and polishing an exposed face in each of said first circuit portions at substantially right angles to said reference surfaces, grinding material from each of said ground exposed faces to form an accurately defined operative gap surface height using one of said reference surfaces as a reference and starting said grinding from a portion of said exposed face at a distance from said one of said reference surfaces which is greater than the utlimately desired gap height, thus producing recessed faces in each of said first circuit portions, and securing a second circuit portion to each of said exposed faces with the interposition of a nonmagnetic gap filling material.

2. A method of manufacturing a multiple magnetic head having accurately defined operative gap surface heights, comprising the steps of: securing a first magnetic circuit portion to each of the two opposing sides of a shielding subassembly including at least one shielding plate, grinding first and second substantially parallel reference surfaces on opposing ends of the resultant body at substantially right angles to said subassembly sides, grinding and polishing an exposed face in each of said first circuit portions at substantially right angles to said reference surfaces, grinding material from each of said ground exposed faces to form an accurately defined operative gap surface of desired height using one of the said reference surfaces as a reference and starting said grinding from a portion of said exposed face at a distance from said one of said reference surfaces which is greater than the ultimately desired gap height, thus producing recessed faces in each of said first circuit portions, and securing a second circuit portion to each of said exposed faces with the interposition of a nonmagnetic gap filling material, and grinding at least one of said reference surfaces using the other reference surface as a reference until the ultimately desired gap height for a respective gap is reached.

3. A method of manufacturing a multiple magnetic head having accurately defined operative gap surface heights, comprising the steps of: securing a first magnetic circuit portion to each of two opposing sides of a shielding subassembly including at least one shielding plate, grinding first and second substantially parallel reference surfaces on opposing ends of the resultant body at substantially right angles to said subassembly sides, grinding and polishing an exposed face in each of said first circuit portions at substantially right angles to said reference surfaces, grinding material from each of said ground exposed faces to form an accurately defined gap surface of desired height using one of said reference surfaces as a reference and starting said grinding from a portion of said exposed face at a distance from said one of said said reference surfaces which is greater than the ultimately desired gap height, thus producing recessed faces in each of said first circuit portion, and securing a second circuit portion to each of said exposed faces with the interposition of a nonmagnetic gap filling material, grinding said first reference surface using said second reference surface as a reference, said last two grinding steps being performed until the ultimately desired gap height for a respective gap is attained, and cutting the resultant body along a plane substantially parallel to said reference surfaces.

References Cited

UNITED STATES PATENTS 2,769,866 11/1956 Kornei ............ 179—100.2

FOREIGN PATENTS 553,156 2/1958 Canada.
241,501 10/1962 Australia.

JOHN F. CAMPBELL, *Primary Examiner.*

D. C. REILEY, *Assistant Examiner.*